United States Patent [19]

Shope et al.

[11] Patent Number: 4,676,557

[45] Date of Patent: Jun. 30, 1987

[54] COOLING SYSTEM FOR WHEELED SAW

[75] Inventors: Leonard L. Shope, Minneapolis; Anthony J. Mertes, Eden Prairie, both of Minn.

[73] Assignee: Cimline, Inc., Minneapolis, Minn.

[21] Appl. No.: 720,359

[22] Filed: Apr. 5, 1985

Related U.S. Application Data

[63] Continuation-in-part of Ser. No. 588,912, Jul. 20, 1984, abandoned, which is a continuation-in-part of Ser. No. 454,561, Dec. 30, 1982, abandoned.

[51] Int. Cl.$^4$ ............................................ E21C 47/00
[52] U.S. Cl. ...................................... 299/39; 83/169; 83/171; 125/28
[58] Field of Search .................. 299/39, 81, 36, 38; 172/15; 51/177; 83/169, 171; 125/13 R, 28

[56] References Cited

U.S. PATENT DOCUMENTS

| | | | |
|---|---|---|---|
| 1,587,949 | 6/1926 | Hansen | 173/22 |
| 1,806,862 | 5/1931 | Owen | 125/13 R |
| 1,824,000 | 9/1931 | Walter | 125/13 R |
| 2,216,989 | 10/1940 | St. Clair | 125/13 R |
| 2,468,336 | 4/1949 | Lewis | 299/39 |
| 2,716,402 | 8/1955 | Harrison, Sr. | 51/240 R |
| 2,736,544 | 2/1956 | Wright | 299/39 |
| 2,810,954 | 10/1957 | Clark | 51/176 |
| 2,857,147 | 10/1958 | Lewis | 299/39 |
| 3,007,687 | 11/1961 | Hatcher | 299/39 |
| 3,037,755 | 6/1962 | Hatcher | 299/39 |
| 3,129,511 | 4/1964 | Williams | 433/100 |
| 3,201,902 | 8/1965 | Benson et al. | 51/206 R |
| 3,256,604 | 6/1966 | Borden | 51/267 |
| 3,347,597 | 10/1967 | Holifield | 299/36 |
| 3,547,492 | 12/1970 | Binger | 299/39 |
| 3,663,060 | 5/1972 | Shatwell et al. | 299/39 |
| 3,848,929 | 11/1974 | Miller | 299/39 |
| 4,188,934 | 2/1980 | Reinhardt et al. | 125/13 R X |
| 4,414,783 | 11/1983 | Vincent | 83/169 |

FOREIGN PATENT DOCUMENTS

| | | | |
|---|---|---|---|
| 2903335 | 2/1980 | Fed. Rep. of Germany | 83/169 |
| 540047 | 10/1941 | United Kingdom | 299/39 |
| 837993 | 9/1979 | U.S.S.R. | 299/39 |

OTHER PUBLICATIONS

"Standard Saw" brochure, Construction Materials, Inc., 6725 Oxford Street, Minneapolis, Minnesota 55426.

"Spray Nozzles and Accessories", Spraying Systems Co., North Ave. at Schmale Rd., Wheaton, IL 60187, pp. 53, 54.

Primary Examiner—Stephen J. Novosad
Assistant Examiner—John F. Letchford
Attorney, Agent, or Firm—Merchant, Gould, Smith, Edell, Welter & Schmidt

[57] ABSTRACT

A cooling system for a wheeled saw for widening cracks in an asphalt or concrete surface is disclosed. The cooling system includes a compressor and a water reservoir which provide pressurized air and water to one or more mist forming nozzles or fluid directing blocks. The mist is directed unto the cutting blade to keep it cool. After enlarging a crack, foreign materials are blown from the crack allowing it to be immediately sealed.

9 Claims, 6 Drawing Figures

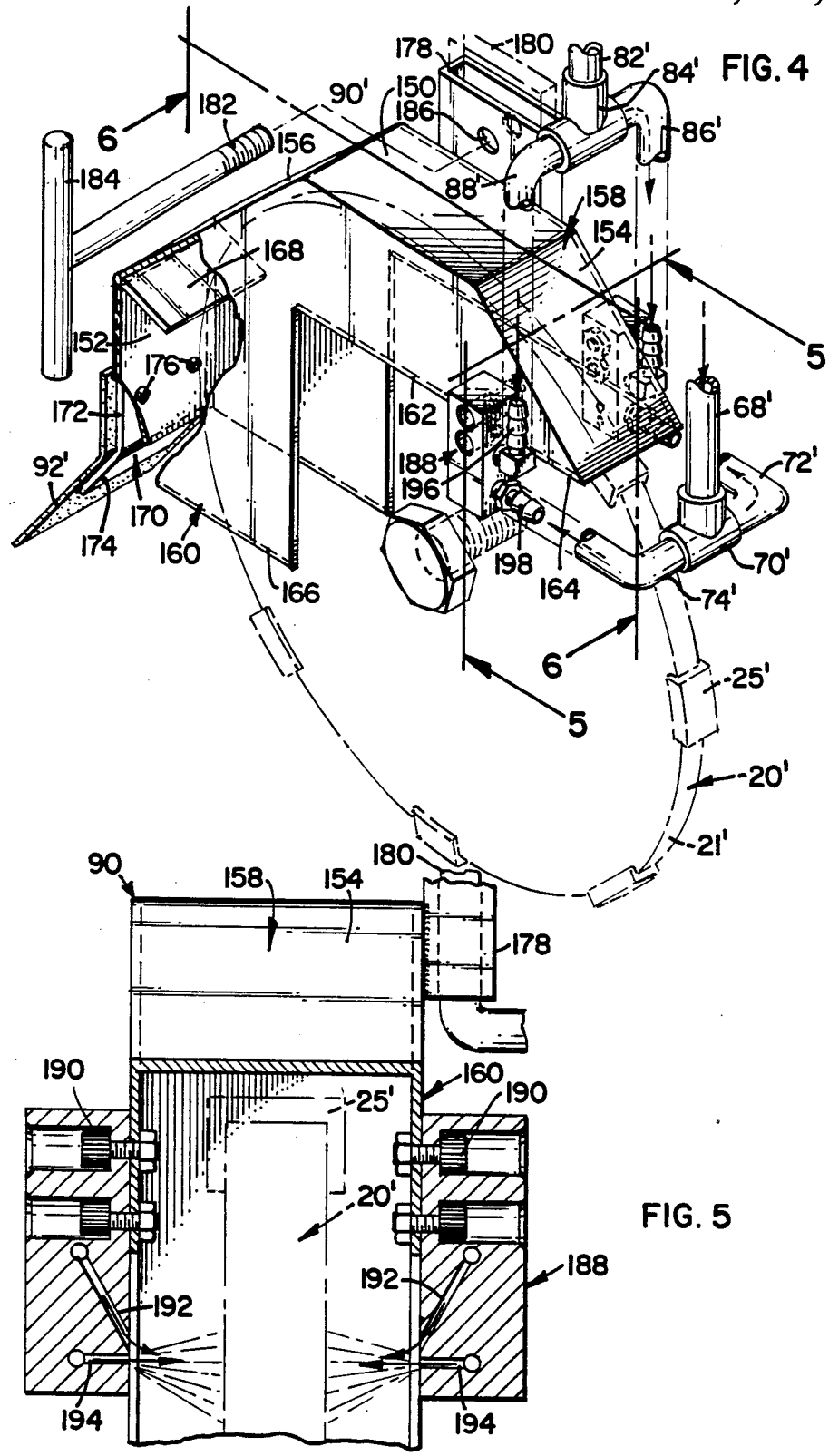

COOLING SYSTEM FOR WHEELED SAW

This is a continuation-in-part application of pending Ser. No. 588,912 filed July 20, 1984, abandoned which was a continuation-in-part application of Ser. No. 454,561 filed Dec. 30,1982, now abandoned.

TECHNICAL FIELD

This invention relates to wheeled saws or routers for enlarging random cracks in asphalt or concrete surfaces. More particularly, a cooling system for the blade of such a saw is disclosed.

BACKGROUND OF THE INVENTION

For years highways and airports have expanded vigorously to create substantial networks which link not only homes and towns to cities, but also countries to other countries. Trucking and airline industries have come to depend heavily on the highway and airport networks. The private automobile is also a heavy user of highways, as well as driveways and parking lots. In recent years inflation has caused the cost of highway and other such construction to increase dramatically. It is now and will be for many years politically and economically difficult to significantly add to either the highway or airport networks. Considering the dependency of both industry and the individual on these networks and the unlikelihood of substantial new construction, the age and level of maintenance of the various highway and airport surfaces takes on increased significance. Greater and greater amounts of highway and airport resources are going toward surface repair. Surface failures have become a monumental problem, a problem directly associated with poor jointing practices.

Many joint sealers have come on the market. Products like rubberized asphalt, silicone rubber, cold tar, PVC and neoprene are being used quite successfully. The selection of a proper sealer is contingent on the type of joint to be sealed and the end result desired. The end result, of course, is further determined by the adequacy of joint preparation and the method followed in applying the joint sealer. For example, consumers are commonly sold a sealant to paint over cracks in asphalt driveways. Although such sealant may cover over the crack for a few months, there is little lasting effect.

The highway industry recognizes that an old sealer must be removed from a crack, or if the crack is new, it must be widened to create a reservoir sufficient to accept a quantity of new sealant. The crack may be prepared by water blasting, routing, or sawing. A joint may be prepared using various known machines, such as single bladed saws on wheeled frames, smaller portable saws, diamond blade random crack routers, and carbide routers. Additionally, water jetting or blasting equipment is known. These various machines require water either as the blasting element or as a cooling element for a blade or router bit. U.S. Pat. No. 2,736,544 and U.S. Pat. No. 3,663,060 are exemplary of wheeled, single bladed saws for use in widening a random crack. Both patents show a cooling system for the blade which includes a mechanism for directing a stream of water onto the blade.

After widening, machines using a stream of water leave a large quantity of water remaining in the vicinity of the crack. It has become common to use more water to remove any slurry or foreign material from the crack. Thereafter, the crack must be allowed to dry before a sealant can be applied. A road must often be closed for several days in order to properly complete the procedure.

Since a large quantity of water is used both for cooling and for cleaning a widened crack, it is nearly a requirement that a water truck be available to supply water to the sawing or routing or water jetting equipment. In some locations, for example, driveways, parking lots, bridges and various highways where it is inconvenient to close large areas, the presence of a water truck is extremely inconvenient if not impossible.

Thus, the requirement for, and once available, the use of large quantities of water with known equipments present the highway and airport repair industry with particularly troublesome problems.

SUMMARY OF THE INVENTION

The present invention is directed to a self-contained machine for making a cut in a surface. The machine includes a wheeled frame, a cutting blade rotatably attached to the frame and a motor supported by the frame for rotatably driving the blade. In addition, a mechanism for cooling the blade is present. The cooling mechanism includes a device for directing an air and water mist onto the blade, thereby conserving consumption of cooling water. The machine is not only self-contained, but it does not leave a quantity of water on the surface.

More particularly, one embodiment of the invention includes a blade having a plurality of cutting elements fastened to a core with a bonding material, such as silver solder. The blade is cooled by a water and air stream from a nozzle. The air is supplied by a compressor driven by the motor while the water is gravity fed from a reservoir located at a height above the nozzle. The entire cooling mechanism is advantageously small and, consequently, supportable on the same frame which supports the cutting blade and motor. The air and water stream keeps the bonding material from deteriorating due to heat and thereby minimizes failure of the bonding material to hold the cutting elements or segments to the core during cutting.

The cooling system of the present invention is essentially a dry system which allows a crack to be immediately sealed after it has been enlarged and foreign materials have been removed. Foreign materials may be removed by directing a stream of pressurized air along the crack. Thus, the repair process is advantageously short, and consequently, less costly than present procedures.

The essentially dry cooling system, however, results in the creation of dust which was not a factor with previous water cooled systems. In one embodiment of the present invention, the dust is advantageously controlled by providing a second mist creating nozzle which is directed away from the operator and at or in the general vicinity of the blade and the asphalt or concrete interface.

In another embodiment, a cover is provided for the blade. A fluid directing block is attached to each side of the cover. Each block includes a water connection and an air connection. The air connection is connected to a channel which is directed substantially perpendicularly toward the blade in the vicinity of the diamond cutting segments of the blade. A water channel is downwardly inclined so that water flows into the air flow from the air channel. The necessary combination of the air and water droplets is formed for cooling the blade. In addition, the air and water streams are directed to opposite sides of the blade and therefore not only cool the diamond cutting segments and bonding, but also tend to confine dust particles. Dust is further controlled in this embodiment with a downwardly directed flap from the blade cover and a baffle extending between opposite side walls of the blade cover at a height approximately the same as the axis of the blade. The baffle and cover side walls, as well as the flap, tend to confine dust. The air and water streams further dissipate dust.

In combination with the dust controlling feature, the present cutting machine is designed to allow the operator to control the machine from its handle while being in full view of the crack and the cutting blade or blade guard.

A further advantage of the present machine is that both the water and the air used in the cooling system may be metered thereby optimizing the cooling and dust control functions.

These advantages and other objects obtained by this invention are further explained and may be better understood by reference to the drawings and to the descriptive matter hereinafter in which a preferred emobodiment of the invention is described in detail.

BRIEF DESCRIPTION OF THE DRAWINGS

FIG. 4 is a perspective view of an alternate embodiment of the blade cover and air and water directing blocks;

FIG. 5 is a cross-sectional view taken along line 5—5 of FIG. 4; and

DETAILED DESCRIPTION OF THE PREFERRED EMBODIMENT

Figure 1:
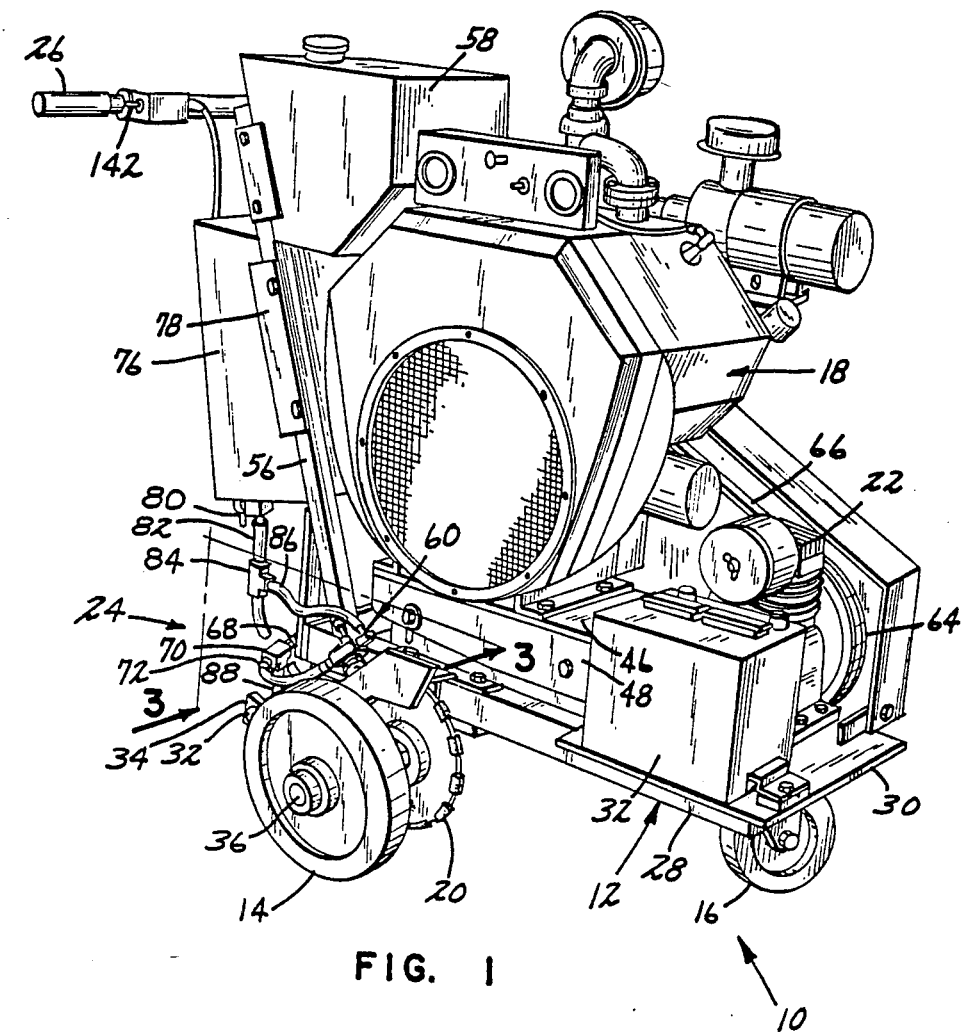
FIG. 1 is a perspective view of a cutting machine in accordance with the present invention.

Referring now to the drawings wherein like reference numerals designate identical or corresponding parts throughout the several views, and more particularly to FIG. 1, a cutting machine representative of the type on which the present invention may be used is designated generally as 10. Machine 10 includes a frame 12 supported by a pair of rear wheels 14 and a pivotable, front wheel 16. Frame 12 in turn supports motor 18 which drives a cutting blade 20. Cutting blade 20 experiences considerable friction and, consequently, heat. Cutting blade 20 is kept cool with a cooling system in accordance with the present invention designated generally as 24. Machine 10 is generally controlled from handle 26 by an operator who can easily position himself to observe blade 20 and the random crack which blade 20 is widening.

Frame 12 includes a plurality of structural members such as angles or box sections welded or otherwise fastened together to form a rectangular structure 28. A plate 30 is fastened to the forward portion of structure 28. Plate 30 supports battery 32. A pivotable caster wheel 16 is attached beneath plate 30.

With respect to rear wheels 14, a cylindrical rod 32 is rotatably attached beneath the rear portion of structure 28. A pair of struts 34 reach forward from rod 32 to hold a pair of axles 36 on which rear wheels 14 turn freely. Struts 34 are fixedly attached to rod 32. Also, link member 38 (see FIG. 2) is fixedly attached to rod 32 near its midpoint. A linear actuator 40 is attached between link member 38 and a bracket 42 fastened to plate 30. Extension of actuator 40 pivots link member 38 and struts 34 about the axis of rod 32 thereby lowering the rear portion of frame 12 with respect to rear wheels 14. Since blade 20 is rotatably attached to the rear underside of structure 28 with an arbor 44, blade 20 is also lowered. By reversing actuator 40, the rear portion of frame 12 is raised with respect to rear wheels 14 and, likewise, blade 20 is raised. Note that the axis of arbor 44 is substantially aligned with the axis of axles 36 to allow blade 20 in combination with castor wheel 16 to easily turn machine 10 to follow along a random crack.

Figure 2:
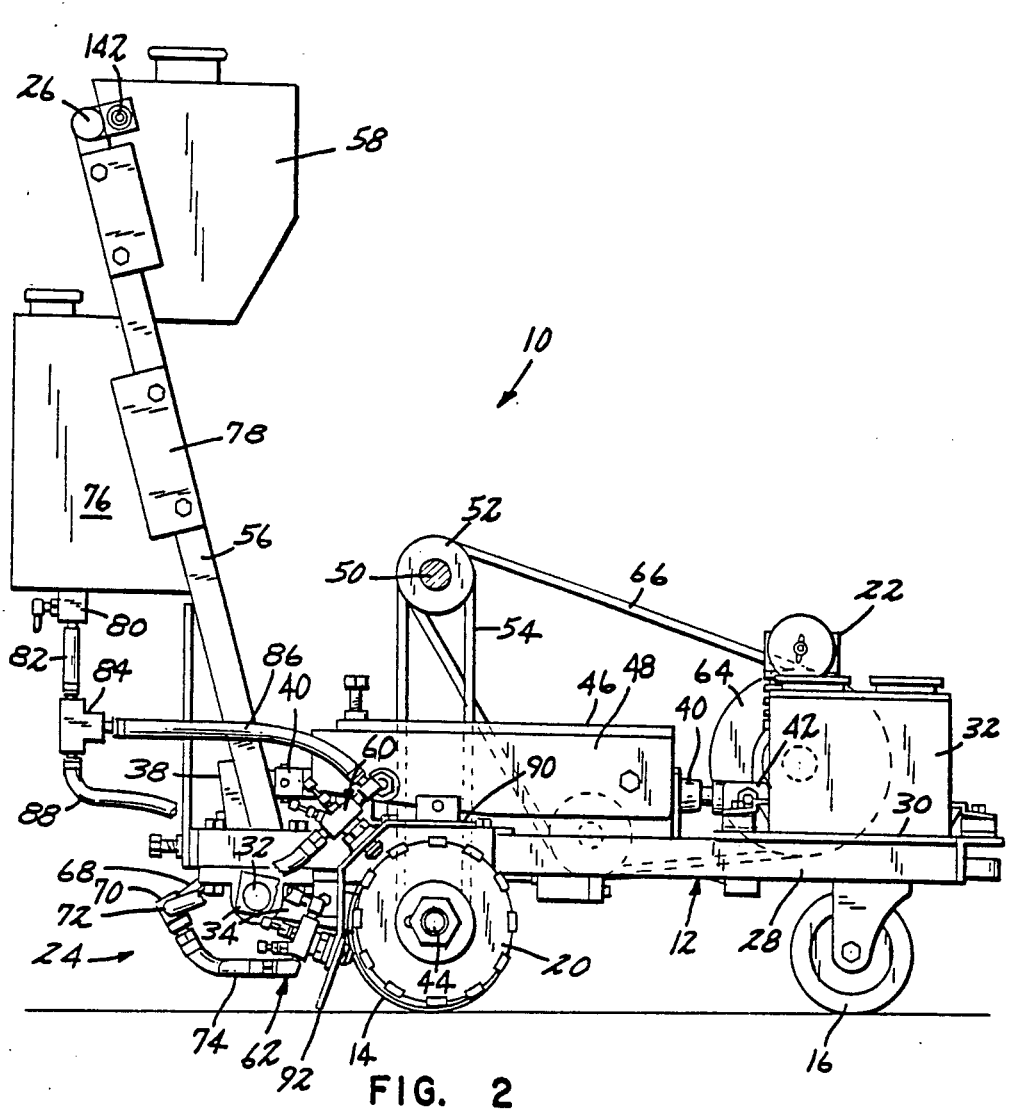
FIG. 2 is a side elevational view of the machine of FIG. 1 with one wheel removed.

Frame 12 supports motor 18 on a platform 46. Platform 46 is held above actuator 40 by side structural members 48 which are adjustably attached to structure 28. As shown in FIG. 2, drive shaft 50 of motor 18 rotates pulleys 52. One of pulleys 52 drives a pulley (not shown) with belt 54 which in turn drives arbor 44 and blade 20.

Members 56 rise substantially vertically from attachment to the rear portion of structure 28 for attachment to handle 26. Near the top thereof, members 56 support a fuel tank 58 for motor 18.

Machine 10 as hereinbefore described in representative of the type of apparatus on which a cooling system 24 may be installed and used.

Cooling system 24 is particularly appropriate for multiple segment blades as shown at 20. Blade 20 has a core 21 with circumferentially spaced grooves 23. Diamond containing elements or segments 25 are sized to fit within grooves 23. Segments 25 and the length of grooves 23 must be tightly controlled so that the spacing tolerance at each end of a groove 23 falls within a range of 0.002 to 0.004 inches and preferably within 0.0020 to 0.0025 inches. Such spacing not only allows the grooves to provide a mechanical retaining mechanism for the segments, but also provides for the greatest bonding strength of the bonding material silver solder at the temperature which the blade reaches considering the cooling effect of system 24. It is recognized that other bonding materials may be used and that other spacings may be appropriate for such other materials.

A segmented blade, such as blade 20, is contrasted with a blade having a continuous diamond containing annulus. The core of a blade having a continuous blade gets much hotter, especially in the vicinity where the abrasive annulus is fastened to the core. The present cooling system is not designed to cool such a blade. There need not be such capability, however, since a continuous annulus blade would not be used on machine 10 for other reasons, e.g., a continuous annulus blade would not move machine 10 forward along a crack in the advantageous fashion of a segmented blade.

Cooling system 24 combines pressurized air and pressurized water at nozzle assembly 60 to form a mist directed toward blade 20. Since the mist contains relatively little water, the asphalt or concrete surface remains essentially dry and, in fact, dust is created by the cutting. Consequently, the machine 10 also shows a second mist forming nozzle assembly 62 directed toward the blade and surface interface for the purpose of controlling dust. The dust controlling second nozzle 62 is thus an advantageous feature, but is understood not to be necessary to the cooling system. It is understood also that if further blade cooling is desired, nozzle 62 may be directed more directly at blade 20 to provide more cooling (but less dust control).

The cooling system 24 includes a compressor 22 energized by pulley 64 which is driven by one of pulleys 52 through belt 66. Compressor 22 is in fluid communication with nozzles 60 and 62 to provide a continuous stream of compressed air to nozzles 60 and 62. Hose 68 is connected to tee 70. Tee 70 splits the air stream and directs it into hoses 72 and 74 which are connected to nozzles 60 and 62, respectively.

Cooling system 24 further includes a tank 76 which is mounted by appropriate brackets 78 to members 56. Tank 76 is in fluid communication with nozzles 60 and 62 and is a water reservoir located at a height above nozzles 60 and 62 to provide pressurized water to the nozzles. Tank 76 is connected through shut-off valve 80 and hose 82 to a tee 84. Tee 84 is connected through a hose 86 to nozzle 60. Tee 84 is also connected through a hose 88 to nozzle 62. In this way, tank 76 provides a continuous flow of water to nozzles 60 and 62.

It is understood that the air and the water systems include as necessary plumbing components which are commonly known and used. Each system provides fluid communication between a source and the nozzles and does so in a leak proof fashion. A particular plumbing network has been indicated for both the air and the water systems, but it is understood that fluid communication between compressor 22 and nozzles 60 and 62 and between tank 76 and nozzles 60 and 62 could be accomplished in a variety of other ways.

Figure 3:
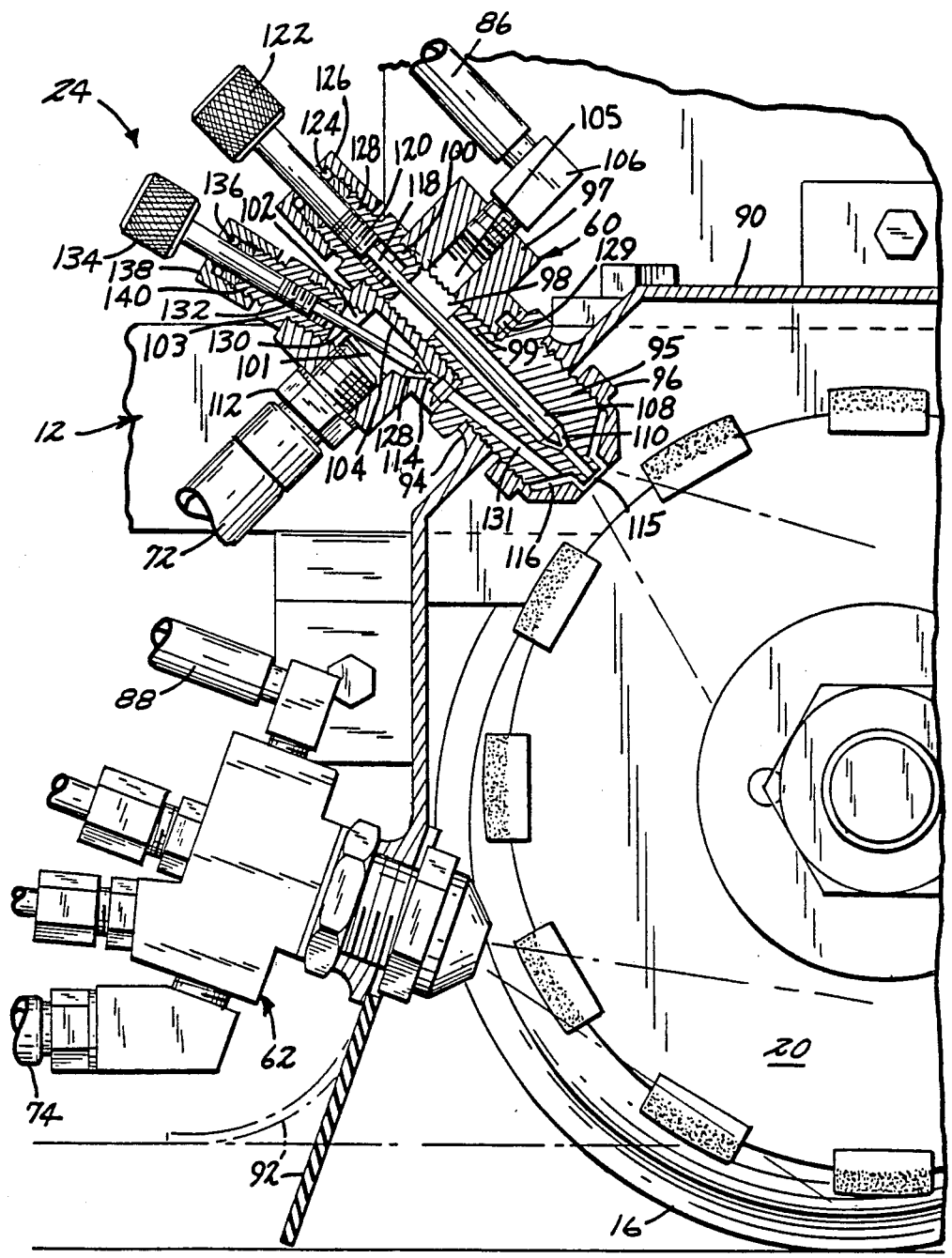
FIG. 3 is a detail view of a nozzle mechanism.

Nozzles 60 and 62 provide a mechanism for combining continuous streams of water and air so as to create a directed mist. One embodiment of nozzles 60 and 62 is shown in FIG. 3. As indicated previously, cooling system 24 may be comprised of a plurality of nozzles or may have only a single nozzle. Additionally, one of the nozzles may be oriented so as to provide a dust control function. In the embodiment of FIG. 3, nozzles 60 and 62 are shown with nozzzle 60 directed primarily at blade 20 and nozzle 62 directed at the interface of blade 20 and the surface to be cut. Nozzles 60 and 62 are supported by blade cover 90 which provides a shield at least over the top portion and rearward portion of blade 20. Additionally, a flexible flap 92 is attached beneath nozzle 62 to deflect cut debris downwardly.

A representative nozzle 60 is shown in cross section in FIG. 3 while nozzle 62 is shown in side elevation. Although nozzle 60 is described hereinafter, it is understood that nozzle 62 is similar. It is further recognized that nozzle 60 and 62 are conventional and that other nozzle designs may be equally advantageous. Nozzle 60 is attached to blade cover 90 at boss 94. Nozzle 60 is attached by screwing lower body 95 into the threaded opening. Nozzle tip 96 is then screwed onto lower body 95. Upper body 97 includes a threaded passage 98. One end of passage 98 is received by upwardly extending, threaded extension 99 of lower body 95 to thereby attach upper body 97 to lower body 95. A primary valve stem holder 100 is threadingly received into the other end of passage 98 to create a water chamber between extension 99 and holder 100.

Upper body 97 also includes an air chamber 101 which is threaded at its open end in one side of body 97 for receipt of fitting 112. A second passage 102 spaced from first passage 98 is threaded and passes from the upper side of upper body 97 to chamber 101. A secondary valve stem holder 103 is threadingly received in passage 102. The water chamber portion of passage 98 and air chamber 101 are separated by wall 104. Water hose 86 is connected through fitting 106 to upper body 97 at passage 105 which connects to the water chamber portion of passage 98. A channel 108 leads from the water chamber to a venturi constriction 110 directed toward blade 20.

Air hose 72 is connected through fitting 112 attached to nozzle body 97 to provide fluid communication for the pressurized air to air chamber 101. Air passes from chamber 101 through a channel 114 to annular space 116 surrounding the smaller end of venturi 110. In this fashion, the pressurized air may mix with and break the stream of water into a distribution of small droplets to create a mist for directive ejection from nozzle 60 at opening 115.

Nozzle 60 may include a mechanism for metering both the air and the water flow. Venturi 110 provides a valve seat for the conically shaped end of stem 118 which has threads at 120 for adjustment with knob 122. Threads 120 engage the threaded passage in holder 100. Stem 118 is sealed with O-ring 124 between cap 126 and holder 100.

Similarly, a metering mechanism is provided for the pressurized air. A regulating device may be used at compressor 22 before the pressurized air flows into tube 68 or the air may be regulated at another location along the plumbing network. In the present embodiment, an adjustable valve mechanism like that described for the pressurized water is included as a part of nozzle 60. That is, stem 130 has a conical tip for mating with the conical surface at 128 of air chamber 101. Channel 114 leads from surface 128 to an annular passage 129 which mates with channel 131 leading to annular space 116. Stem 130 is threaded at 132 for turning with knob 134. Threads 132 engage the threaded passage in holder 103. Stem 130 is sealed with O-ring 136 appropriately compressed between cap 138 and portion 140 of nozzle 60.

Figure 6:
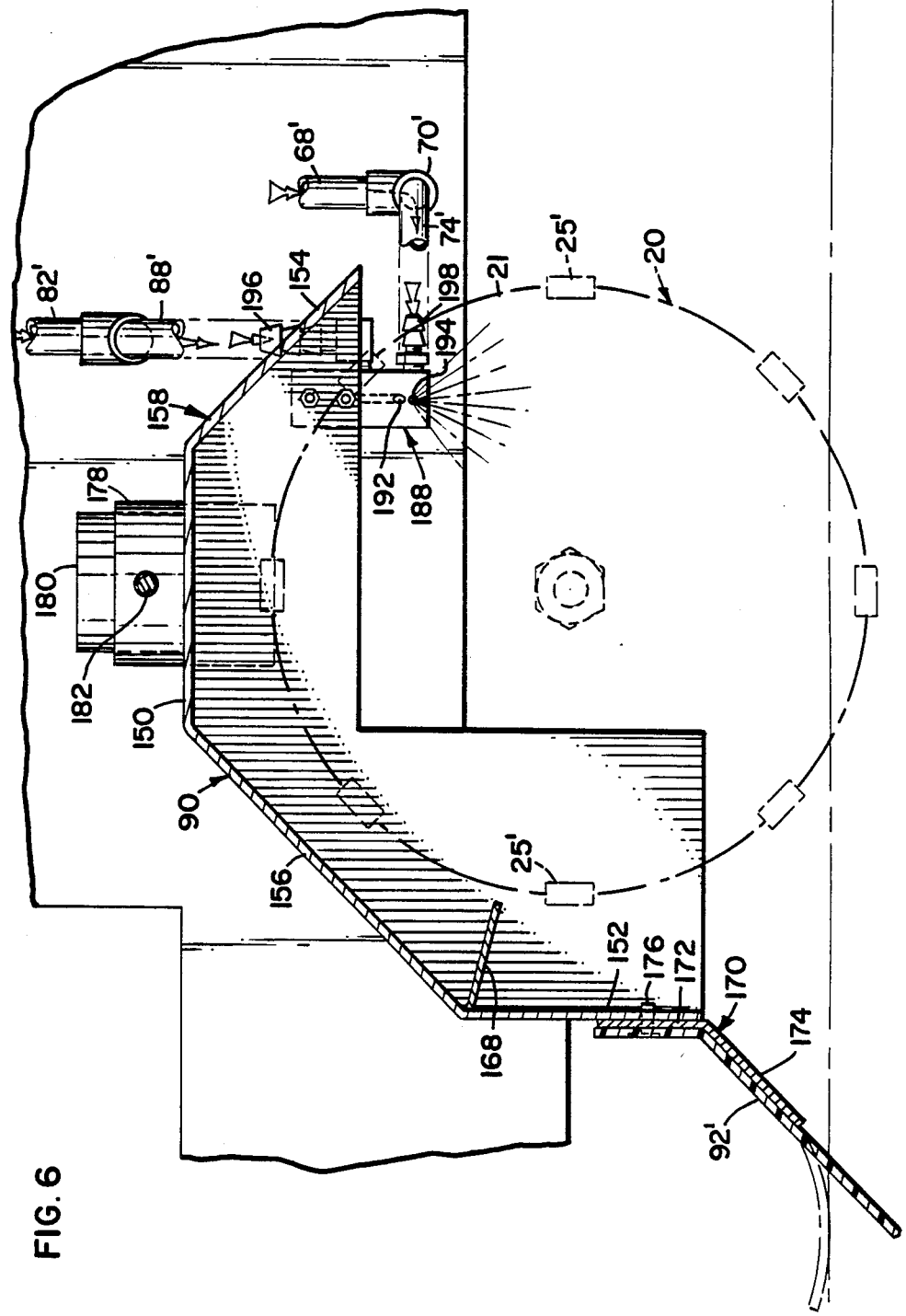
FIG. 6 is a cross-sectional view taken along line 6—6 of FIG. 4.

In an alternate embodiment as shown in FIGS. 4-6, elements equivalent to those of the previous embodiment are identified with the same numbers only primed, while other elements are given new numbers. Cover 90' for blade 20' is shown to provide a protective covering from about a 45 degree upward line from the axis of blade 20' extending forwardly from a vertical line through the axis of blade 20' to about a 45 degree downward line from the axis of blade 20' extending rearwardly from the vertical line through the axis of blade 20'. The cover has a flat, horizontal top 150 and a flat vertical back 152. Inclined portion 154 extends downwardly and forwardly from top 150 and inclined portion 156 extends downwardly and rearwardly from top 150 to back 152. Top 150, back 152, and inclined portions 154 and 156 are preferably a common piece 158 of material appropriately bent. Side walls 160 are attached to piece 158 by welding or other known mechanism. Each side wall 160 is shaped to have a bottom edge 162 extending rearwardly from the lower corner 164 of forward inclined portion 154. Edge 162 extends rearwardly beyond the vertical line through the axis of blade 20' and then extends downwardly to meet lower edge 166 which is approximately horizontal and in line with the lower end of back 152. Although cover 90' has been described in some detail, it is understood that the particular shape of cover 90' may be varied considerably without affecting the function of guarding blade 20', serving as a support for fluid directing blocks 188 and aiding in dust control.

Cover 90' further includes a baffle 168 extending toward blade 20' from near the intersection of backwardly inclined portion 156 and back 152 and between sidewalls 160. Baffle 168 functions to control dust and debris from circulating within cover 90' in conjunction with the rotation of blade 20'.

Cover 90' also includes a support 170 for flap 92'. Support 170 is an angled member having a vertical portion 172 attached to back 152 and a rearwardly inclined portion 174 for holding flexible flap 92' in a rearwardly inclined configuration. Flap 92' and support 170 are attached to back 152 with two or more nut and bolt combinations 176.

Cover 90' accummulates dirt and debris in the vicinity of baffle 168, so it is desirable to provide for easy removal for cleaning purposes. Thus, a rectangular box member 178 is attached to the side wall 166 nearer the rest of machine 10 by welding or other similar mechanism. Box member 178 simply slides onto a rectangular plate 180 which is fastened to machine 10 (not shown in FIGS. 4–6). Cover 90' is held securely to the machine by inserting threaded rod 182 of handle 184 into aligned passage 186 of box member 178 and plate 180.

A fluid directing block 188 is attached with a pair of nut and bolt combinations 190 to each of side walls 160 of cover 90'. Each block 188 includes a first channel 192 for directing water and a second channel 194 for directing air. A nipple 196 is attached to block 188 in fluid communication with first channel 192 for receiving one of hoses 88' or 86' which is connected as described hereinbefore to a water reservoir. A second nipple 198 is likewise attached to the block 188 in fluid communication with second channel 194 for receiving one of hoses 72' or 74' for connection to the air compressor as described hereinbefore. Blocks 188 are positioned and attached to side walls 160 so that air channel 194 is directed to the side of blade 20' in the vicinity of cutting segments 25 as the segments rotate with blade 20'. Air channel 194 has an outlet portion which is directed substantially perpendicular to the plane of blade 20'. Water channel 192 is downwardly inclined with an outlet end near the outlet of air channel 194 so that water flows into the air flow from air channel 194. Preferably, water channel 192 is inclined at an angle greater than 45 degrees with respect to the horizontal. Such relative positioning of water and air channels 192 and 194 provide for a mixing of the water and air to create a mist which is directed toward the sides of blade 20' in the vicinity of segments 25'. The water and air mist help confine any dust or debris trailing along with the rotating blade 20', but more importantly direct the limited amount of cooling air and water directly onto the portion of the blade which gets the hottest and which must be cooled so as to prevent failure, namely, cooling the bonding material to hold segments 25' to core 21'. It is understood that more than one pair of fluid directing blocks could be used. It is further understood that the fluid directing blocks could be located at a different location than just described and then is shown in the drawings, although it is distinctly preferable to locate the blocks so that the air and water mist is directed to the vicinity of segments 25' as blade 20' rotates. It has been found that the presently indicated location of blocks 188 near the forward end of cover 90' wherein the air and water streams are directed against blade 20' at a point where the blade is going down toward the surface to be cut not only provides excellent cooling, but also tends to wet blade 20' as it enters the surface to be cut and thereby wet to some extent the dust and debris which helps prevent the dust and debris from flying to create a cloud around the machine. As indicated previously, flap 92' and baffle 152 then function to confine the slightly wetted dust and debris.

In use with respect to the embodiment of machine 10, motor 18 is started. Although a clutch mechanism may be used, for the present disclosure it is sufficient to recognize that motor 18 drives blade 20 and compressor 22. Compressor 22 provides a continuous stream of compressed air through the plumbing system to nozzles 60 and 62. An electrical switch 142 attached to handle 26 is electrically connected with actuator 40 and is used as appropriate to operate actuator 40 to raise or lower blade 20 with respect to rear wheel 14. As blade 20 is lowered into a crack so it begins cutting the asphalt or concrete surface, valve 80 is opened to allow water from tank 76 to flow through the water plumbing system to nozzles 60 and 62. The continuous stream of pressurized water and air are combined at nozzles 60 and 62 to form a directed mist. Nozzle 60 is appropriately directed at blade 20 to cool blade 20. Nozzle 62 is directed toward the interface of blade 20 with the asphalt or concrete surface to control dust which may otherwise move rearwardly toward the operator of machine 10. Since machine 10 has a single castor wheel 16 in the front, machine 10 tends to propel itself by the rotation of blade 20 along the randomly directed crack. The operator may provide some forwardly directed force.

When machine 10 reaches the side of the road or the end of the crack, switch 142 is again used to raise blade 20 with respect to rear wheels 14. Valve 80 is closed to stop the flow of water to nozzles 60 and 62, and motor 18 may be turned off to stop compressor 22 and blade 20.

The operation of machine 10 with the alternate embodiment cover 90' and fluid directing blocks 188 is similar. It is observed that the fluid directing blocks are much simpler than nozzles 60 and 62. Furthermore, the air flow substantially perpendicular to the plane of blade 20' is efficient for directing the air-water mixture to the area where it is most needed, that is, the bonding interface between segments 25' and core 21'. In addition, the oppositely directed streams tend to confine any dust and debris trailing along with rotating blade 20'.

It is pointed out that cover 90' is easily installed and removed when the machine stopped with blade 20' not rotating and the air and water systems off. Hoses 72', 74', 86' and 88' are removed from nipples 196 and 198. Handle 184 is turned to remove it from passage 186. Cover 90' is then easily raised and slipped off plate 180. The system is reassembled by reversing the steps.

The cooling system of the present invention prevents blade 20 or 20' from heating excessively. More particularly, the cooling system comprising one or more directed streams of air and water mists at blade 20 or 20' functions to keep the bonding material for segments 25 or 25' from deteriorating due to heat. This minimizes the likelihood of failure of the bonding material thereby minimizing the likelihood of the blade throwing or releasing segments. At the same time, the water needs of the cooling system are so low that machine 10 may support its own water supply in the form of tank 76. Thus, machine 10 is completely self-contained. Furthermore, a crack may be appropriately widened in a fashion which does not leave the surface flooded with water. Once the various foreign materials have been blown from the widened crack, it may be immediately sealed. Although saws and routers are known in the art, it has not been until the present invention that a crack may be widened and sealed almost immediately thereafter.

This present invention has thus been described with numerous characteristics and advantages set forth. It is to be understood, however, that the disclosure is illustrative only. Various details of the structure and function were presented, but changes made, especially in matters of shape, size, and arrangement, to the full extent extended by the general meaning of the terms in which the appended claims are expressed, are understood to be within the principle of the present invention.

What is claimed is:

1. A machine for making a cut in the surface of concrete or asphalt, comprising:
   a wheeled frame;
   a cutting blade rotatably attached to said frame, said blade having a plurality of cutting segments fastened to a core with bonding means;
   a motor, supported by said frame, for driving said blade;
   means, supported by said frame, for continuously cooling said blade to keep said bonding means from deteriorating due to heat thereby minimizing failure of said bonding means to hold said segments to said core during operation, said cooling means including means for ejecting an air and water mist onto said blade, said blade, said motor, and said cooling means being supported by said frame to make said machine self-contained.

2. A machine in accordance with claim 1 wherein said ejecting means includes a nozzle which combines pressurized water and pressurized air to create the mist.

3. A machine in accordance with claim 2 wherein said cooling means includes an air compressor supported by said frame, said compressor being continuously driven by said motor to provide a continuous stream of pressurized air to said nozzle.

4. A machine in accordance with claim 2 wherein said cooling means includes a reservoir of water supported by said frame at a height above said nozzle, said height providing water pressure to force said water through said nozzle.

5. A machine in accordance with claim 1 including a blade cover for said blade and wherein said ejecting means includes a pair of fluid directing blocks and means for attaching each of said blocks to a side wall of said blade cover, one of said blocks being attached to a side wall on one side of said blade and the other of said blocks being attached to a side wall on the opposite side of said blade, each of said blocks including means for directing water and air in the form of a mist toward a side of said blade in the vicinity of said cutting segments, whereby the water and air mist is directed toward both sides of said blade in the vicinity of said segments to cool said core, said segments and said bonding means.

6. A machine in accordance with claim 5 wherein said directing means includes in each block a downwardly directed first channel for water and a second channel for air, said second channel being directed generally perpendicularly toward said blade, the water from said first channel draining into air flow from said second channel.

7. A self-contained machine for making a cut in a concrete or asphalt surface, comprising:
   a wheeled frame;
   a cutting blade rotatably attached to said frame, said blade having diamond containing elements fitting within circumferentially spaced grooves about a core, said blade further including means for bonding each of said elements in one of said grooves to said core;
   means for cooling said blade to keep said bonding means from deteriorating due to heat thereby minimizing failure of said bonding means to hold said segments to said core during operation, said cooling means including means for ejecting pressurized air and pressurized water in the form of a mist against said blade, said cooling means also including an air compressor supported by said frame for providing the pressurized air, said cooling means further including a reservoir of water supported by said frame at a height above said ejecting means for providing said pressurized water; and
   a motor for driving said blade and said air compressor.

8. A machine in accordance with claim 7 including a blade cover for said blade and wherein said ejecting means includes a pair of fluid directing blocks and means for attaching each of said blocks to a side wall of said blade cover, one of said blocks being attached to a side wall on one side of said blade and the other of said blocks being attached to a side wall on the opposite side of said blade, each of said blocks including means for directing water and air toward a side of said blade in the vicinity of said cutting elements, whereby the water and air is directed toward both sides of said blade in the vicinity of said elements to cool said core, said elements and said bonding means.

9. A machine in accordance with claim 8 wherein said ejecting means includes in each block a first channel for water and a second channel for air, said first channel being directed downwardly at an angle greater than 45 degrees relative to the horizontal, said second channel being directed generally perpendicularly toward said blade, the water from said first channel draining into air flow from said second channel.

* * * * *